United States Patent
Saarikko et al.

(10) Patent No.: US 12,352,536 B2
(45) Date of Patent: Jul. 8, 2025

(54) PROJECTILE AND METHOD FOR STOPPING AERIAL VEHICLES

(71) Applicant: PATRIA LAND OY, Helsinki (FI)

(72) Inventors: Matti Saarikko, Helsinki (FI); Jari Lemmetyinen, Helsinki (FI); Vesa Toivonen, Helsinki (FI); Markku Paija, Helsinki (FI)

(73) Assignee: PATRIA LAND OY, Helsinki (FI)

( * ) Notice: Subject to any disclaimer, the term of this patent is extended or adjusted under 35 U.S.C. 154(b) by 61 days.

(21) Appl. No.: 18/038,344

(22) PCT Filed: Nov. 22, 2021

(86) PCT No.: PCT/FI2021/050800
§ 371 (c)(1),
(2) Date: May 23, 2023

(87) PCT Pub. No.: WO2022/112653
PCT Pub. Date: Jun. 2, 2022

(65) Prior Publication Data
US 2024/0093975 A1    Mar. 21, 2024

(30) Foreign Application Priority Data
Nov. 24, 2020 (FI) ................................ 20206193

(51) Int. Cl.
*F41H 11/04* (2006.01)
*F42B 12/56* (2006.01)

(52) U.S. Cl.
CPC .............. *F41H 11/04* (2013.01); *F42B 12/56* (2013.01)

(58) Field of Classification Search
CPC .................................. F41H 11/04; F42B 12/56
See application file for complete search history.

(56) References Cited

U.S. PATENT DOCUMENTS

| | | | | | |
|---|---|---|---|---|---|
| 1,664,401 | A | * | 4/1928 | Craig | A63H 37/00 102/357 |
| 2,274,655 | A | * | 3/1942 | Bickel | F42B 12/58 102/504 |

(Continued)

FOREIGN PATENT DOCUMENTS

| CN | 105711850 A | 6/2016 |
|---|---|---|
| CN | 210400184 U | 4/2020 |

(Continued)

OTHER PUBLICATIONS

International Preliminary Report on Patentability in Application No. PCT/FI2021/050800, mailed Apr. 25, 2023, 8 pages.

(Continued)

*Primary Examiner* — Michelle Clement
(74) *Attorney, Agent, or Firm* — Meunier Carlin & Curfman LLC

(57) ABSTRACT

A projectile and method for stopping aerial vehicles. The projectile comprises a shell—and a bunch of filaments. The bunch is wound in a coil and placed inside the shell. The projectile according to the solution may be brought to a target by different methods and utilising different means. For example, the projectile may be fired with compressed air or a propulsion charge, by using a compressed air weapon or rocket launcher. In addition, the projectile may be taken to the target by using a rocket or aerial vehicle.

14 Claims, 3 Drawing Sheets

(56) References Cited

U.S. PATENT DOCUMENTS

| | | | | |
|---|---|---|---|---|
| 2,296,980 | A * | 9/1942 | Carmichael | F42B 12/66 102/504 |
| 3,575,083 | A * | 4/1971 | Hudick | F42B 12/68 42/105 |
| 3,760,735 | A * | 9/1973 | Schmitt | F42B 12/38 102/451 |
| 4,055,247 | A * | 10/1977 | Benedick | F42B 39/14 220/288 |
| 4,271,761 | A * | 6/1981 | Canning | F42B 12/68 102/504 |
| 4,327,644 | A * | 5/1982 | Stancil | F42B 12/68 102/504 |
| 4,651,999 | A * | 3/1987 | Sturm | F42B 6/04 473/578 |
| 4,750,692 | A * | 6/1988 | Howard | B64G 1/646 244/172.6 |
| 5,033,385 | A * | 7/1991 | Zeren | H01Q 15/145 102/357 |
| 5,315,932 | A * | 5/1994 | Bertram | F41H 13/0006 102/504 |
| 5,335,488 | A * | 8/1994 | Honigsbaum | F41G 7/228 57/220 |
| 5,448,937 | A * | 9/1995 | Buc | F42B 30/04 89/1.13 |
| 5,460,155 | A * | 10/1995 | Hobbs, II | F42B 12/68 124/56 |
| 5,493,627 | A * | 2/1996 | Pan | F41G 7/32 425/DIG. 7 |
| 5,579,628 | A * | 12/1996 | Dunbar | D02G 3/047 57/247 |
| 5,637,825 | A * | 6/1997 | Glenning | F42B 15/04 114/21.1 |
| 5,698,815 | A * | 12/1997 | Ragner | F41H 13/0006 102/504 |
| 5,773,370 | A * | 6/1998 | Dunbar | F41H 5/0485 2/102 |
| 5,996,504 | A * | 12/1999 | Lowery | E04H 17/045 102/504 |
| 6,392,213 | B1 * | 5/2002 | Martorana | B64U 50/13 89/1.816 |
| 7,950,329 | B1 * | 5/2011 | Nemtyshkin | F42B 12/36 102/504 |
| 7,987,791 | B2 * | 8/2011 | Schneider | F42B 12/68 102/504 |
| 8,082,835 | B2 * | 12/2011 | Soukos | F41H 11/02 89/36.01 |
| 8,082,849 | B2 * | 12/2011 | Schneider | F42B 12/62 102/504 |
| 8,100,359 | B2 * | 1/2012 | Al-Qaffas | F41F 1/06 244/3.1 |
| 8,381,376 | B2 * | 2/2013 | Halstead | D04H 1/492 28/103 |
| 8,402,894 | B1 * | 3/2013 | McGuigan | F41H 11/10 102/504 |
| 8,434,711 | B2 * | 5/2013 | Berman | F41H 11/04 244/33 |
| 8,596,178 | B2 * | 12/2013 | Rogers | F41H 13/0006 89/902 |
| 8,601,928 | B2 * | 12/2013 | Martinez | F42B 12/40 114/317 |
| 8,757,039 | B2 * | 6/2014 | Martinez | B63G 9/04 404/6 |
| 9,074,856 | B1 * | 7/2015 | Freitag | F42B 12/34 |
| 9,074,858 | B2 * | 7/2015 | Yee | F42B 15/01 |
| 9,260,204 | B2 * | 2/2016 | Hickman | B64G 1/405 |
| 9,546,855 | B2 * | 1/2017 | Higham | F41B 11/723 |
| 9,989,336 | B2 * | 6/2018 | Purvis | F41H 13/0006 |
| 10,036,615 | B2 * | 7/2018 | Norris | F41H 13/0006 |
| 10,107,599 | B2 * | 10/2018 | Norris | F41H 13/0006 |
| 10,435,153 | B2 * | 10/2019 | Klein | F41B 11/80 |
| 10,663,266 | B2 * | 5/2020 | Banga | B64U 70/30 |
| 10,703,451 | B1 * | 7/2020 | Adams | F41F 3/10 |
| 10,871,353 | B2 * | 12/2020 | Down | F41H 11/02 |
| 10,926,875 | B2 * | 2/2021 | Klein | B64U 10/13 |
| 11,255,643 | B2 * | 2/2022 | Ang | F41H 13/0006 |
| 11,440,287 | B2 * | 9/2022 | Kratzer | B32B 1/08 |
| 11,472,550 | B2 * | 10/2022 | Smith | B64D 1/00 |
| 11,499,804 | B2 * | 11/2022 | Metz | F41F 3/042 |
| 11,635,280 | B2 * | 4/2023 | Chen | F41H 5/0492 89/36.02 |
| 11,661,678 | B2 * | 5/2023 | Simmelink | D01D 5/18 89/36.02 |
| 11,697,497 | B2 * | 7/2023 | Smith | G05D 1/101 244/110 C |
| 11,814,190 | B2 * | 11/2023 | Gooch | F41B 11/723 |
| 11,852,445 | B2 * | 12/2023 | Bigelow | F42B 10/28 |
| 11,895,999 | B2 * | 2/2024 | Bunker | A01M 1/2027 |
| 12,044,509 | B1 * | 7/2024 | Borter | F41B 11/62 |
| 2002/0124761 | A1 * | 9/2002 | Valembois | F42B 12/68 102/504 |
| 2005/0075043 | A1 * | 4/2005 | Lorenzana | A63H 37/00 446/475 |
| 2009/0114761 | A1 * | 5/2009 | Sells, II | F41H 13/0006 244/3.1 |
| 2010/0181424 | A1 * | 7/2010 | Goossen | F41H 13/0006 244/110 F |
| 2010/0242775 | A1 * | 9/2010 | Schneider | F42B 12/62 102/504 |
| 2010/0242776 | A1 | 9/2010 | Schneider et al. | |
| 2010/0242777 | A1 | 9/2010 | Schneider et al. | |
| 2012/0216697 | A1 * | 8/2012 | Jacobsen | F41B 9/0093 89/7 |
| 2015/0078891 | A1 * | 3/2015 | Hayse | D03D 1/00 428/36.1 |
| 2017/0219317 | A1 * | 8/2017 | Sands | F41H 13/0006 |
| 2017/0261292 | A1 * | 9/2017 | Armstrong | F41H 11/02 |
| 2017/0291704 | A1 * | 10/2017 | Alegria | G01S 15/02 |
| 2018/0025778 | A1 | 1/2018 | Mori et al. | |
| 2018/0162529 | A1 * | 6/2018 | Klein | F41H 11/04 |
| 2018/0224262 | A1 * | 8/2018 | Klein | F41H 13/0006 |
| 2018/0257780 | A1 | 9/2018 | Sassinsky | |
| 2018/0299231 | A1 | 10/2018 | Cohen et al. | |
| 2019/0120600 | A1 | 4/2019 | Holihan et al. | |
| 2019/0129427 | A1 * | 5/2019 | Sugaki | B64D 7/00 |
| 2019/0346241 | A1 * | 11/2019 | Metz | B64U 70/83 |
| 2019/0363821 | A1 | 11/2019 | Whittaker | |
| 2020/0108922 | A1 * | 4/2020 | Smith | G05D 1/12 |
| 2020/0108923 | A1 * | 4/2020 | Smith | G05D 1/104 |
| 2020/0108924 | A1 | 4/2020 | Smith et al. | |
| 2020/0108925 | A1 * | 4/2020 | Smith | B64D 1/08 |
| 2020/0108926 | A1 * | 4/2020 | Smith | G05D 1/101 |
| 2020/0363165 | A1 * | 11/2020 | Ang | F41H 11/02 |
| 2020/0378716 | A1 * | 12/2020 | Flint | F42B 12/62 |
| 2021/0188435 | A1 * | 6/2021 | Smith | G05D 1/104 |
| 2022/0042220 | A1 * | 2/2022 | Khokar | D04C 1/02 |
| 2022/0214146 | A1 * | 7/2022 | Morton | B64D 3/00 |
| 2024/0044625 | A1 * | 2/2024 | Bollfrass | F42B 12/66 |

FOREIGN PATENT DOCUMENTS

| | | |
|---|---|---|
| IN | 110806147 A | 2/2020 |
| KR | 102152739 B1 | 9/2020 |
| RU | 201935 U1 | 1/2021 |

OTHER PUBLICATIONS

International Search Report and Written Opinion in Application No. PCT/FI2021/050800, mailed Feb. 17, 2022, 18 pages.
Rock West Carbon Fiber Grades: It's all About Tensile Modulus. Rock West Composites, [online], Dec. 26, 2019, [retrieved on Feb. 7, 2022]. Retrieved from https://web.archive.org/web/20191226164308/ https://www.rockwestcomposites.com/blog/carbon-fiber-grades-its-all-abouttensile-modulus/.
Extended European Search Report for EP Application No. 21897258.6 dated Sep. 30, 2024.

\* cited by examiner

PROJECTILE AND METHOD FOR STOPPING AERIAL VEHICLES

This is a U.S. National Stage application of international application number PCT/FI2021/050800 filed on Nov. 22, 2021, and claiming priority to Finnish national application number FI20206193 filed on Nov. 24, 2020.

BACKGROUND

The solution relates to deterring unmanned aerial vehicles (UAV). Solutions for UAVs are disclosed, for example, in publications U.S. Pat. No. 10,435,153, deterring WO2020112245A2, US20180257780A1, WO2019074573A1, US20180299231A1, WO2020208330A1 and CN110806147A.

Brief Disclosure

As unmanned aerial vehicles of various kinds become more common so does the need to be protected against them. UAVs are easy to come by and their controllability, range, and load-carrying capacity are continuously increasing, so using them to cause damage is also increasing.

It is an object of the solution to develop a new kind of solution for fighting off unmanned aerial vehicles and other small devices travelling by air. The solution is characterised by what is stated in the independent claims. Some embodiments of the solution are disclosed in the dependent claims.

The disclosed solution comprises a projectile which comprises a shell and a bunch of filaments, the bunch being wound in a coil, and the bunch being placed within the shell. The projectile according to the invention may be delivered to the target with different methods and by using various means. For example, the projectile may be fired by making use of compressed air or a propulsion charge, by using a compressed air weapon or grenade launcher, for example. The projectile may also be taken to the target by using a rocket or an aerial vehicle.

As the projectile is flying in the air, the coiled filament bunch included in the shell is released into the air. The filament bunch floating in the air produces an obstacle in the air for the operation of an aerial vehicle. Hitting an aerial vehicle, air current from a propeller of an aerial vehicle, or a propeller of an aerial vehicle causes the filaments loosen from the filament bunch. The filaments included in the bunch may, for example, be sucked in the motor of the aerial vehicle, get entangled in its rotors and stop them, or get stuck on the aerial vehicle surface thereby harming its flight characteristics.

In a solution according to an example, the filaments are of carbon fibre. Advantages of carbon fibre include its lightness and good tensile strength. Due to their lightness, it is possible to pack a large number of long filaments in the projectile. Lightness also helps the filaments float in the air without falling too quickly. Due to the good tensile strength of carbon fibre, when a filament gets entangled in the aerial vehicle rotors or sucked in the aerial vehicle motor, it will not snap but becomes tangled in the motor parts causing the rotor or motor to jam or break.

In a solution according to an example, the filaments are of an electrically conductive material. The electrically conductive material may be carbon fibre, for example. An advantage of making the filaments of an electrically conductive material is that, for example, when a filament finds its way in a motor of an electrically driven aerial vehicle, the filament may cause the motor to break by causing a short circuit or another electrical fault.

In a solution according to an example, the filament bunch comprises at least 1000 filaments. When made of carbon fibre, a large number of filaments may be included in the bunch. A filament bunch consisting of filament made of carbon fibres is a carbon fibre tow. A large number of filaments easily causes one or some filaments to find their way inside an aerial vehicle or rotors or to get stuck on the surface of the aerial vehicle.

In a solution according to an example, the length of the filaments is 8 to 16 metres. With such a solution, a fairly large obstacle can be established, but the filament bunch may still be kept relatively small in weight and when wound on a coil, relatively small as concerns its outer dimensions.

In a solution according to an example, the filaments comprised by the bunch are fastened together at substantially one end thereof. Fastening together at one end may have the advantage of the handling of the bunches of filaments becoming easier.

In a solution according to an example, the projectile comprises a packing plate. The packing plate comprises a substantially circular plate-like piece substantially corresponding to the size of the diameter of a coil formed by a filament bunch substantially wound in a coil, that is, a filament coil. An advantage of using a packing plate may be keeping the filament coils unstuck to each other in connection with their packing and handling.

In a solution according to an example, the packing plate is of plastic, cardboard, paper, or paperboard.

The size of the packing plate may vary. The size of the packing plate may vary according to the length, thickness, or material of the filaments, for example. In an example the diameter of the packing plate is 40 to 120 mm. An advantage of using a packing plate may also be that the handling of coiled filament bunches is facilitated when the filament coils do not get stuck to each other. In addition, the coils are easier to store.

In a solution according to an example, the filament bunch is fastened at one end to the packing plate. In a solution according to an example, the filament bunch is fastened at one end to the centre part of the packing plate. By fastening the filament bunch to the centre of the packing plate may result in the advantage that as good as possible a balance is achieved as an opened projectile is floating to the ground. A filament bunch fastened at one end to the packing plate may be wound in a coil so that one end of the filament bunch is fastened to the centre of the packing plate and the remaining filament bunch is wound around it. In such a case, as the coil has been released into the sky, its unwinding begins from its outermost edge, moving towards the coil centre. Finally, the opened filament bunch hangs from the centre of the packing plate. By fastening the filament bunch to the centre of the packing plate may result in the advantage that as good as possible a balance is achieved as an opened projectile is floating to the ground. When the filament bunch is hanging from the centre of the packing plate, the packing plate stays the best in the horizontal position, gets the best air drag, and the descent speed is as slow as possible. A further advantage of the coil formed by the filament bunch unwinding in the sky from the outer edge may be that the filament bunch will the most likely remain unentangled.

In a solution according to an example, the filament coil formed by filaments wound in a coil and the packing plate are mutually parallel. Being parallel means that the planar surface of the packing plate and the upper or lower surface of the filament coil are in the same direction. For example, the filament coil may rest on the packing plate. An advantage of the filament coil and packing plate being parallel may be facilitating the handling of the coils due to as large a portion as possible of the coil surface being protected by the packing plate.

The projectile, as its outermost part, comprises a shell within which one or more filament coils may be placed. According to a solution of an example, at least three filament coils are placed inside the projectile shell. By placing a plurality of filament coils in a projectile, an advantage may be a faster forming of an obstacle in the sky as a single firing results in a plurality of filament coils in the air. An advantage may also be an increase in reliability when the quantity compensates for the effect of potentially unopened filament coils included in the projectile.

In a solution according to an example, the projectile comprises means to open the shell. An advantage of the means for opening the shell is an increase in the reliability of the projectile.

In a solution according to an example, the projectile and propulsion charge are both arranged inside a case. This means that the projectile comprises the propulsion charge and, as the outermost part, the case. An advantage of using a propulsion charge may be increasing the range of the projectile. A further advantage may be an increase in the speed of the projectile. The advantages of increasing the speed and range are that the obstacle can be fanned out in the air in the shortest possible time. The obstacle may also be fanned out on the basis of the detected trajectory of the aerial vehicles instead of prediction.

BRIEF DESCRIPTION OF THE DRAWINGS

The invention will now be described in more detail in connection with preferred embodiments and with reference to the accompanying drawings, in which.

DETAILED DESCRIPTION OF THE FIGURES

The disclosed solution comprises a projectile which comprises a shell and a bunch of filaments. The filament bunch is wound in a coil and the bunch placed inside the shell. The projectile according to the invention may be delivered to the target with different methods and by using various means. For example, the projectile may be fired by making use of compressed air or a propulsion charge, by using a compressed air weapon or grenade launcher, for example. The projectile may also be taken to the target by using a rocket or an aerial vehicle. Taking to a target comprises carrying or moving the projectile to an intended area in the air. The intended area may be determined in advance to secure a specific area in connection with a public event, or the intended area may be determined reactively on the basis of observations.

In the air, at least one filament bunch wound in a coil and included in the shell is released in the air from the shell, and the filament bunch opens up and descends towards the ground supported by the packing plate. The filament bunch floating in the air produces an obstacle in the air for the operation of an aerial vehicle. Hitting an aerial vehicle, air current from a propeller of an aerial vehicle, or a propeller of an aerial vehicle causes the filament bunch to loosen. The filaments included in the bunch may, for example, be sucked in the motor of the aerial vehicle, get entangled in its rotors and stop them, or get stuck on the aerial vehicle surface thereby harming its flight characteristics.

Figure 1:
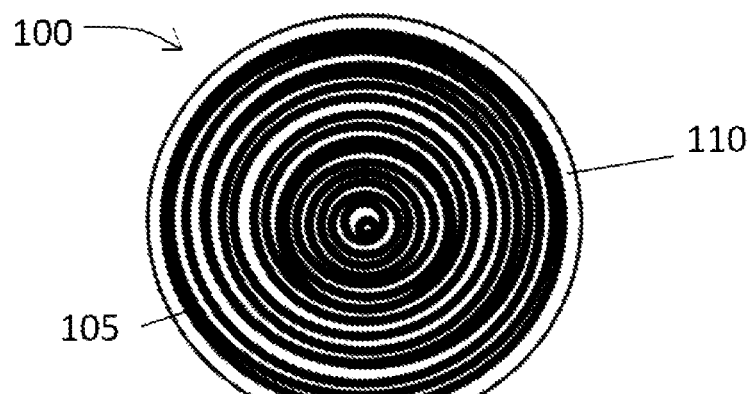
FIG. 1 is a schematic top view of a filament coil.

FIG. 1 shows a top view of a filament coil 100. The filament coil 100 comprises a filament bunch 105 rolled up in a coil. Additionally in the example of FIG. 1, the filament coil comprises a packing plate 110. The filament bunch 105 comprises at least 100 filaments. A filament bunch according to an example may comprise 500 to 50000 filaments, advantageously 10000 to 30000 filaments, and particularly advantageously 10000 to 15000 filaments. A filament bunch according to an example comprises at least 1000 filaments. A filament bunch according to an example comprise no more than 50000 filaments.

An increase in the number of filaments comprised by a filament bunch increases the thickness of the filament bunch. With an increase in the thickness, the length of the filament bunch has to be decreased if the diameter of the filament coil is not to be increased. If the goal is to use a grenade launcher or compressed air weapon, for example, to shoot the projectiles, the diameter of the projectile has to be adapted to suit them. It is also possible to make projectiles of a larger diameter for shooting with other means, whereby the carbon fibre tow used in them may comprise more than 50000 filaments and/or the length of the carbon fibre tow may be longer than that disclosed herein.

The filament bunch may be, for example, 0.1 to 10 mm thick, or, for example, 0.1 to 5 mm. The cross section of a filament bunch may be round or alternatively deviating from a round cross section, such as flat. The thickness of a flat filament bunch may be, for example, 0.1 to 5 mm and the width in this case 0.3 to 10 mm, for example.

The length of the filament affects the size of the obstacle that the filament bunch creates in the air, and the descend rate of the filament bunch because length increases weight. The weight of the filament bunch is affected by its thickness and length. The filament length may vary between 1 and 30 metres. The length of the filaments may advantageously be between 8 and 16 metres, preferably between 10 and 14 metres, whereby the filament bunch creates big enough a floating obstacle without too fast a descend caused by the length-induced weight.

The filaments may have been made of different materials. The filaments may have been made of carbon fibre, for example. When the filaments are made of carbon fibre, the term carbon fibre tow may be used of the filament bunch. In a filament bunch, the filaments are not intertwined or twisted together but they are bunched laterally in parallel. An advantage of manufacturing of carbon fibre is the lightness of carbon fibre, which allows a large number of filaments to be packed in one projectile. A further advantage of carbon fibre is the good tensile strength due to which the filament does not snap when it finds its way to the rotors or motor of an aerial vehicle, but it may get entangled in the motor or rotors causing them to stop or break. A further advantage of carbon fibre is its electrical conductivity which may cause a short circuit or another electrical failure when sucked into the motor of an aerial vehicle.

The filaments comprised by the filament bunch are substantially fastened together at one end. Substantially fastening together at one end comprises fastening together at the remotest end of the filaments, or in relation to the filament length, at a short distance from it. The filaments may be fastened together at one end, only, whereby the filaments comprised by the other end of the filament bunch are left free. Connecting the filaments together at one end may also comprise connecting without a separate fastening means used for fastening the filament bunch. For example, the filament bunch may be fastened directly to the packing plate. By fastening the filament bunch at one end, uncontrolled spreading of the filaments is prevented and thereby the handling of the filament bunch is facilitated when a projectile is being manufactured, as well as the cleaning of opened projectiles.

The filament coil shown in FIG. 1 comprises a packing plate. The packing plate may be made of different materials such as plastic, paper, cardboard, or paperboard. The physical shape of the packing plate may be substantially round, whereby its shape corresponds with the shape of a coiled filament bunch. The size of the packing plate may correspond substantially with the size of the filament bunch so that the diameter of the filament bunch is substantially the same as the diameter of the packing plate. The filament bunch may be fixed at one end to the packing plate and wound in a coil parallel with the packing plate, or the filament bunch wound in a coil may be fastened at one end to the packing plate. The centre points of the packing plate and filament disc are substantially at the same point.

Once the projectile has been fired into the sky or otherwise carried to the target and the filament coils included in it have been released into the air, the filament bunch wound in a coil is opened in the air. The air drag of the packing plate is larger than that of the filament bunch, which means that when descending the packing plate acts as a decelerator for the sinking of the filament bunch. The air drag of the packing plate, which is larger than that of the filament bunch, also causes the filament bunch fixed at one end to the packing plate to hang substantially downwards from the packing plate. An advantage of hanging downwards is as large as possible an obstacle in the air, caused by the filament opening up, as well as predicting the location of the obstacle whereby projectiles may be fired at the desired distances.

The filament bunch fixed to the packing plate is fixed to the packing plate so that the end of the filament bunch where the filaments included in the filament bunch are fastened together is fixed to the packing plate. The end of the filament bunch, which comprises filaments not fastened together, will be the furthest from the packing plate. As the filament disc is descending from the sky, slowed down by the packing plate, the filament bunch hanging from the packing plate is spread in the airspace within the scope of its length. When an aerial vehicle, airflow from an aerial vehicle, or propellers of an aerial vehicle hit the filament bunch, the filament bunch is loosened and the filaments are separated from the bunch.

A filament bunch fastened at one end to the packing plate may be wound in a coil so that one end of the filament bunch is fastened to the centre of the packing plate and the remaining filament bunch is wound around it. Furthermore, with the filaments comprised by a filament bunch being fastened together at one end, the filament bunch is attached to the packing plate at the end where the filaments comprised by the filament bunch are fixed fastened together, whereby the free ends of the filaments comprised by the filament bunch will be the furthest from the packing plate.

Once released into the sky, the filament coil begins to open up. The air drag of the packing plate slows the packing plate down, whereby the filament bunch wound in a coil begins to unwind by the effect of gravity. Finally, the opened filament bunch is hanging from the centre point of the packing plate. By fastening the filament bunch to the centre of the packing plate may result in the advantage that as good as possible a balance is achieved as an opened filament disc is floating to the ground. When the filament bunch is hanging from the centre of the packing plate, the packing plate stays the best in the horizontal position, gets the best air drag, and the descent speed is as slow as possible.

In a solution according to an example, the filaments comprised by a filament bunch are fastened together at substantially the centre of the filament bunch, and the filament bunch is fixed by its centre point to the packing plate. In such a case, as the opened filament disc is floating down from the sky, supported from the packing plate, filament bunch ends of substantially the same length are hanging down from both sides of the fastening point.

In a solution according to an example, the packing plate comprises edges that surround the outer edge of the packing plate substantially at a 90-degree angle in relation to the packing plate. In the example, the round part of the packing plate forms the bottom and the edges form a wall whose height substantially corresponds with the lateral height of the filament coil to be placed inside them. In case the packing plate comprises edges, an advantage may be a further facilitation in handling the filament coils.

In a solution according to an example, the packing plate comprises holes or other openings through which air can flow as the projectile is floating downward. An advantage of the openings comprised by the packing plate may be control of the airflow, whereby as an opened filament disc is floating downward, with the packing plate acting as a decelerator, a better balance may be achieved and thereby the operating period increased as long as possible.

Figure 2:
FIG. 2 is a schematic side view of a filament coil.

FIG. 2 shows a side view of a filament coil 100. As shown in FIG. 2, the filament bunch 105 and packing plate 110 are substantially parallel to each other. In addition, the packing plate and filament bunch wound in a coil are substantially of the same size. Being parallel may be an advantage in handling the filament coils 100 because the packing plate 110 and filament bunch 105 stay together better. In addition, it is possible to place a plurality of filament coils 100, comprising a packing plate 110, stacked on top of each other inside the projectile shell. Placing one on the other has the advantage that the form of a completed projectile is longitudinal so that its air drag remains as small as possible and flight characteristics as good as possible. A further advantage is that the diameter of the projectile is kept adequately small whereby no separate means are needed to fire it, but commonly used means such as grenade launchers or compressed air weapons may be used.

Figure 3:
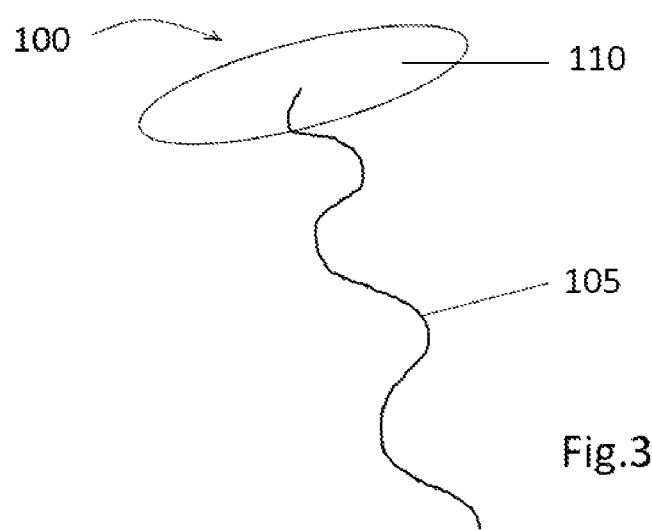
FIG. 3 is a schematic side view of a descending filament coil.

FIG. 3 shows an opened filament coil 100 descending from the sky, in which a filament bunch 105 unwound from a coil is hanging from the packing plate 110. In the example shown in FIG. 3, the filaments included in the filament bunch are fastened together at one end. The filaments comprised by the filament bunch are fastened together at one end, only. The filament bunch is fixed to the packing plate at the end where the filaments are fastened together, so the end of the filament bunch where the filaments are free will be hanging the furthest from the packing plate. In FIG. 3, the filament bunch and packing plate are floating downwards with the packing plate acting as a decelerator. If an aerial vehicle or another flying device hits the filament bunch, or close enough to the filament bunch, the hitting or airflow may cause the filaments to separate from the bunch. A filament separated from the bunch may cause the aerial vehicle to fall by sticking to its rotors of or being sucked in its motor through, for example, an air intake. A filament made of carbon fibre may also stick on the surface of the aerial vehicle, either making it fall or harming its flight characteristics and controllability.

Figure 4:
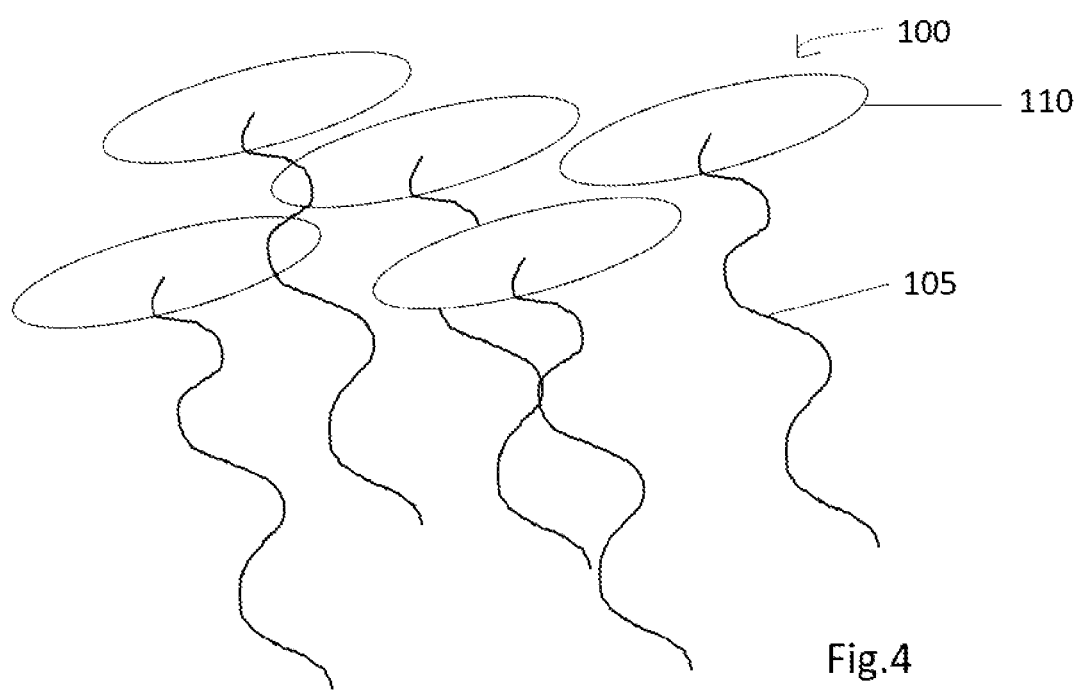
FIG. 4 is a schematic side view of a group of descending filament coils.

FIG. 4 shows an example of a curtain-like obstacle formed by a plurality of opened filament coils 100 floating from the sky. Such a curtain-like obstacle may be created by firing a projectile comprising a plurality of filament coils into the sky. Once the filament coils included in the projectile have been released into the sky, the filament bunch comprised by them open up and the opened filament coils float, hanging from the packing plate, towards the ground.

Figure 5:
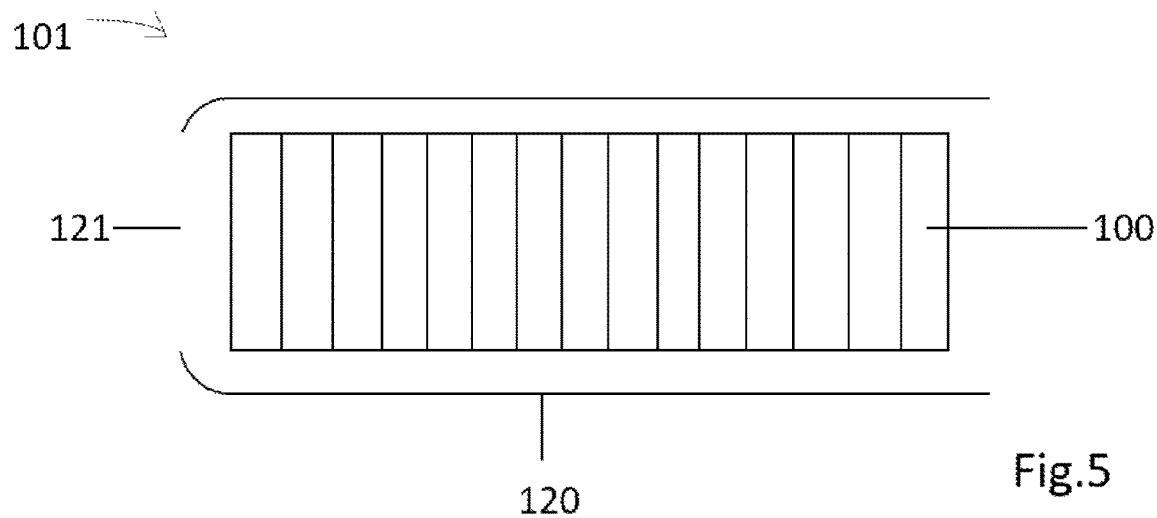
FIG. 5 is a schematic cross section of an embodiment of the projectile as seen from the side.

The example of FIG. 5 shows a side view of a cross section for a projectile 101 where filament coils 100, either stacked one on the other or successively, have been placed inside the shell 120. At one end, the shell 120 comprises an opening 121 through which the filament coils placed inside the shell may be released once the projectile has been fired in the air.

In a solution according to an example, the filament coils are placed inside the shell and set radially as well as one on the other. A radial placement comprises setting the filament coils in a fan-like manner, partly parallel and partly one on the other, whereby one layer comprises, instead of one, a plurality of filament coils. There may be a plurality of such layers one on the other. Such an arrangement is advantageous, if the goal is to include a large number of filament coils in a projectile.

In a solution according to an example, there are stacks formed of filament coils placed inside the shell one on the other and successively so that at least two stacks are side by side. Placing filament coils inside a shell may also be carried out in other ways.

The outer diameter of a projectile may be 40 to 120 mm, for example, advantageously 66 to 81 mm. The outer diameter of the projectile determines by which means its firing is possible. A projectile advantageously having the diameter between 66 and 81 mm may be fired with a grenade launcher or compressed air weapon. On the other hand, if larger projectiles with a diameter of more than 120 mm are to be fired, other means may be used when needed or they may be carried to the destination in other ways, such as by a rocket or aerial vehicle.

The shell comprised by the projectile may comprise a case, sheath, or another reinforcement inside which necessary means, such as filament coils, may be placed. Inside the shell comprised by the projectile one or more filament coils may be placed. In an example, there are at least three filament coils placed inside the shell. In an example, there are 10 to 20 filament coils placed inside the shell.

The material of the shell comprised by the projectile may be metal, such as steel or aluminium, or it may be plastic or cardboard, for example. In a solution according to an example, the shell is made of polyethylene PE or polypropylene PP. The shell may also be made of a material that is destroyed by burning, for example, when a spreading charge has exploded once the projectile has reached a suitable height.

The front of the shell comprises a first end in the firing direction, and the rear end of the shell comprises a second end in the firing direction. The shell may be open at both the front and rear ends. The shell may also be open at one end and closed at another end. The shell may also closed at both ends.

Figure 6:
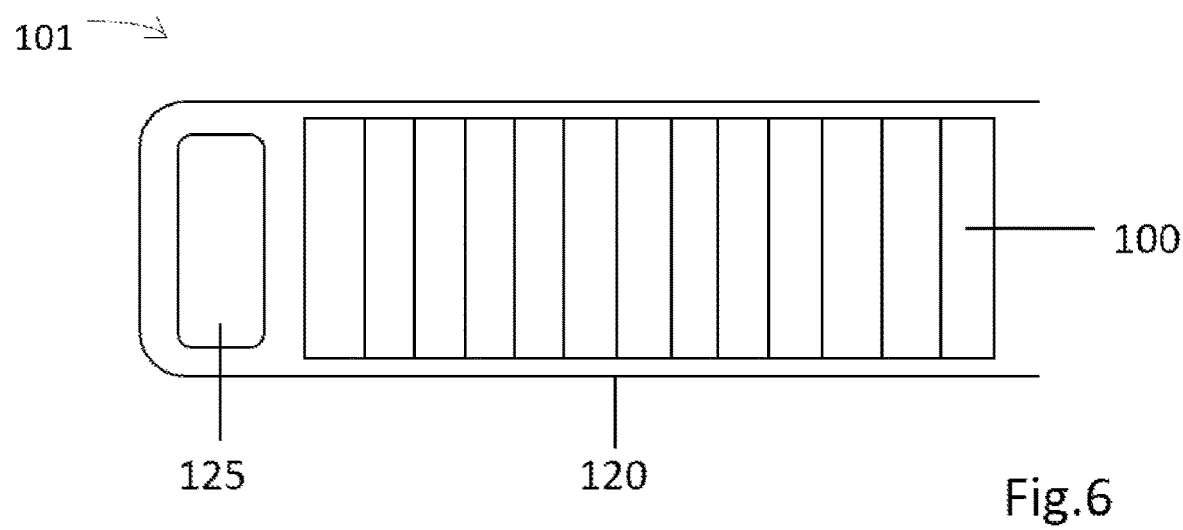
FIG. 6 is a schematic cross section of an embodiment of the projectile as seen from the side.

The shell may additionally comprise means to open the shell. The example of FIG. 6 shows a side view of a cross section for a projectile 101 where filament coils 100 and a spreading charge 125 have been placed inside the shell 120. The spreading charge may open the shell or push the filament coils out of the shell. The spreading charge may comprise gunpowder or another pyrotechnic substance producing plenty of gas pressure or volume. An advantage of using spreading charges may be an increase in the reliability of the projectile and the timeliness of the release of the filament discs. The use of spreading charges may be applicable when projectiles are fired far away or when using a strong or durable material in the projectile shell.

The means for opening the shell may also comprise modifications made in the shell, furthering the shell to open. For example, there may be impairments made in the projectile shell, which further the shell to open and the release of the filament coils included therein. In an example, the shell is open at one end, whereby the filament coils may be released through the opening into the sky.

Figure 7:
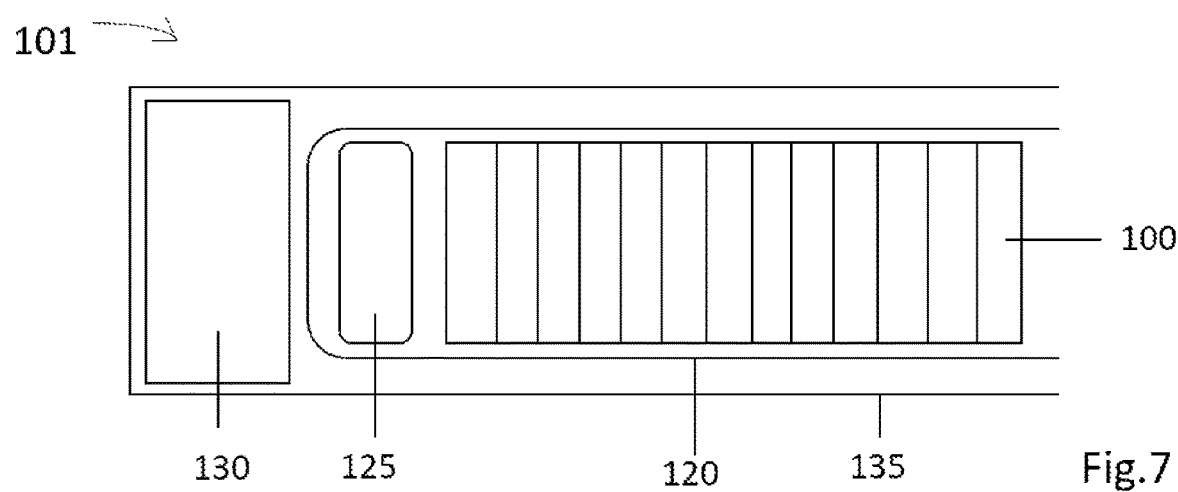
FIG. 7 is a schematic cross section of an embodiment of the projectile as seen from the side.

The example of FIG. 7 shows a side view of a cross section for a projectile 101 where filament coils 100 and a spreading charge 125 have been adapted inside the shell 120. In addition, the example of FIG. 7 comprises a propulsion charge 130 and, as the outermost part, a case 135. The propulsion charge 130 and shell 120 which comprises the filament coils 100 and spreading charge 125 have been placed inside the case 135. The propulsion charge may comprise, for example, gunpowder or another pyrotechnic substance producing plenty of gas pressure or volume.

An advantage of using a propulsion charge may be that the projectile may be fired further away, or a faster flight speed achieved than without a propulsion charge. The propulsion charge may comprise, for example, gunpowder or another pyrotechnic substance producing plenty of gas pressure or volume. The propulsion charge may elevate or direct the projectile to a desired distance which may be further away than the distance achieved without the help of the propulsion charge. The case 135 may be made of, for example, a metal such as steel or another suitable material. Using a case provides the advantage that the use of a propulsion charge is possible.

An advantage of the projectile according to the disclosed solution may be that it is possible to form in the air obstacles as needed to protect certain areas. Obstacles may be formed in the air to be on the safe side, anticipating a situation, or the projectile may be fired reactively onto the flight path of a detected aerial vehicle. The projectile according to the solution is environmentally safe and may be used in city centres, for example, where precautionary measures based on firing with live ammunition are not available. A further advantage of the projectile is its scalability both in relation to the size and firing methods. Furthermore, an advantage of the projectile is its simplicity due to which the projectile may be difficult to detect or interfere with.

Those skilled in the art will find it obvious that, as technology advances, the basic idea of the invention may be implemented in many different ways. The invention and its embodiments are thus not restricted to the examples described above but may vary within the scope of the claims.

The invention claimed is:

1. A projectile comprising
a shell and
a bunch of filaments,
the bunch of filaments being wound in a coil and placed inside the shell,
wherein
the filaments are of carbon fibre and the filament bunch is a carbon fibre tow comprising at least 1000 filaments.

2. The projectile as claimed in claim 1, wherein the filaments comprised by the bunch are fastened together substantially at one end.

3. The projectile as claimed in claim 1, wherein the filament bunch 50000 filaments, at the most.

4. The projectile as claimed in claim 1, wherein the filament bunch comprises 10000 to 30000 filaments.

5. The projectile as claimed in claim 1, wherein filament bunch has a length of 8 to 16 metres.

6. The projectile as claimed in claim 1, wherein an outer diameter of the projectile is 40 to 120 mm.

7. The projectile as claimed in claim 1, wherein the projectile further comprises a packing plate to which the filament bunch is coupled.

8. The projectile as claimed in claim 7, wherein the packing plate (110) is of plastic, cardboard, paper, or paperboard.

9. The projectile as claimed in claim 7, wherein the filament coil formed by the filament bunch wound in a coil and the packing plate are mutually parallel.

10. The projectile as claimed in claim 7, wherein the filament bunch is fixed at one end to the centre part of the packing plate.

11. The projectile as claimed in claim 1, wherein at least three filament coils are placed inside the shell.

12. The projectile as claimed in claim 1, wherein the projectile further comprises means to open the shell.

13. The projectile as claimed in claim 1, wherein the projectile further comprises a propulsion charge and a case as its outermost part.

14. A method for stopping aerial vehicles, the method comprising forming an obstacle in the air by making use of a projectile comprising
a shell and
a bunch of filaments,
the bunch being wound in a coil and
the bunch being placed inside the shell,
whereby the filaments are of carbon fibre and the filament bunch is a carbon fibre tow comprising at least 1000 filaments.

* * * * *